United States Patent
Zimlich et al.

[11] Patent Number: 5,353,592
[45] Date of Patent: Oct. 11, 1994

[54] ENGINE AIR/FUEL CONTROL WITH MONITORING

[75] Inventors: Glenn A. Zimlich, Dearborn Heights; Daniel V. Orzel, Westland; Tri T. Truong, Inkster, all of Mich.

[73] Assignee: Ford Motor Company, Dearborn, Mich.

[21] Appl. No.: 157,548

[22] Filed: Nov. 26, 1993

[51] Int. Cl.$^5$ .............................................. F01N 3/20
[52] U.S. Cl. ........................................ 60/274; 60/276; 60/277; 60/285; 123/703
[58] Field of Search ............... 60/274, 276, 277, 285, 60/297; 123/672, 674, 703

[56] References Cited

U.S. PATENT DOCUMENTS

| | | | |
|---|---|---|---|
| 5,025,767 | 6/1991 | Kume et al. | 60/276 |
| 5,119,631 | 6/1992 | Kayanuma | 60/277 |
| 5,125,231 | 6/1992 | Patil | 60/274 |
| 5,220,788 | 6/1992 | Kurita | 60/274 |
| 5,251,437 | 10/1993 | Furuya | 60/276 |
| 5,315,824 | 5/1994 | Takeshima | 60/297 |

*Primary Examiner*—Ira S. Lazarus
*Assistant Examiner*—Daniel J. O'Connor
*Attorney, Agent, or Firm*—Allan J. Lippa; Roger L. May

[57] ABSTRACT

A control system and method maintains engine air/fuel operation near stoichiometry in response to exhaust gas oxygen sensors positioned both upstream and downstream of a catalytic converter. A converter efficiency test cycle is generated during air/fuel feedback control after engine operation occurs in a plurality of airflow ranges for a period determined by a count in transitions of a feedback variable derived from the upstream sensor. Upon each transition in the downstream sensor, the measurement of inducted airflow at which such transition occurred is accumulated. At the end of the test cycle, converter efficiency is determined by an average of such airflow accumulations.

16 Claims, 5 Drawing Sheets

5,353,592

ENGINE AIR/FUEL CONTROL WITH MONITORING

FIELD OF THE INVENTION

The invention relates to controlling engine air/fuel ratio while concurrently monitoring the efficiency of a catalytic converter coupled to the engine's exhaust.

BACKGROUND OF THE INVENTION

Air/fuel engine control systems responsive to exhaust gas oxygen sensors positioned both upstream and downstream of a catalytic converter are well known. Various attempts have been made to provide an indication of converter efficiency in response to outputs derived from the upstream and downstream sensors. In one approach a comparison of downstream to upstream sensor amplitudes over a predetermined time provides an indication of converter efficiency. In another known approach, a frequency ratio of downstream to upstream sensor outputs over a predetermined time was used to provide an indication of converter efficiency.

The inventors herein have recognized numerous problems with these prior approaches. For example, variations in the manner in which a vehicle is driven during the predetermined time period in which converter efficiency was tested may result in variations of test results.

SUMMARY OF THE INVENTION

An object of the invention herein is to provide accurate monitoring of catalytic converter efficiency while concurrently maintaining engine air/fuel control. The above object is achieved, and problems of prior approaches overcome, by providing both a control system and method for controlling engine air/fuel ratio while concurrently monitoring efficiency of the converter. In one particular aspect of the invention, the method comprises the steps of: adjusting the engine air/fuel ratio in response to a feedback variable derived from an output of an upstream exhaust gas oxygen sensor positioned upstream of the converter; accumulating one of a plurality of airflow values upon each transition in output states of a downstream sensor positioned downstream of the converter, each of the airflow values being related to one of a plurality of inducted airflow ranges and the airflow value which is accumulated upon the downstream sensor output transition is related to the airflow range in which the downstream sensor output transition occurred; and averaging the accumulated airflow values over a test period and providing an indication of converter degradation when the average falls below a preselected average. Preferably, the test period is completed when the engine has operated within each of a plurality of inducted airflow ranges for at least a minimum duration in each of the airflow ranges. The minimum duration is preferably determined when a preselected number of upstream sensor output transitions has occurred for each of the airflow ranges.

An advantage of the above aspect of the invention is that the operating conditions under which the converter is tested remain relatively stable from one test to another despite variations in the manner in which the vehicle is operated during the test period. Highly accurate and consistent test results are thereby obtained.

BRIEF DESCRIPTION OF THE DRAWINGS

The object and advantages of the invention will be more clearly understood by reading an example of an embodiment in which the invention is used to advantage with reference to the attached drawings wherein.

DESCRIPTION OF AN EMBODIMENT

Figure 1:
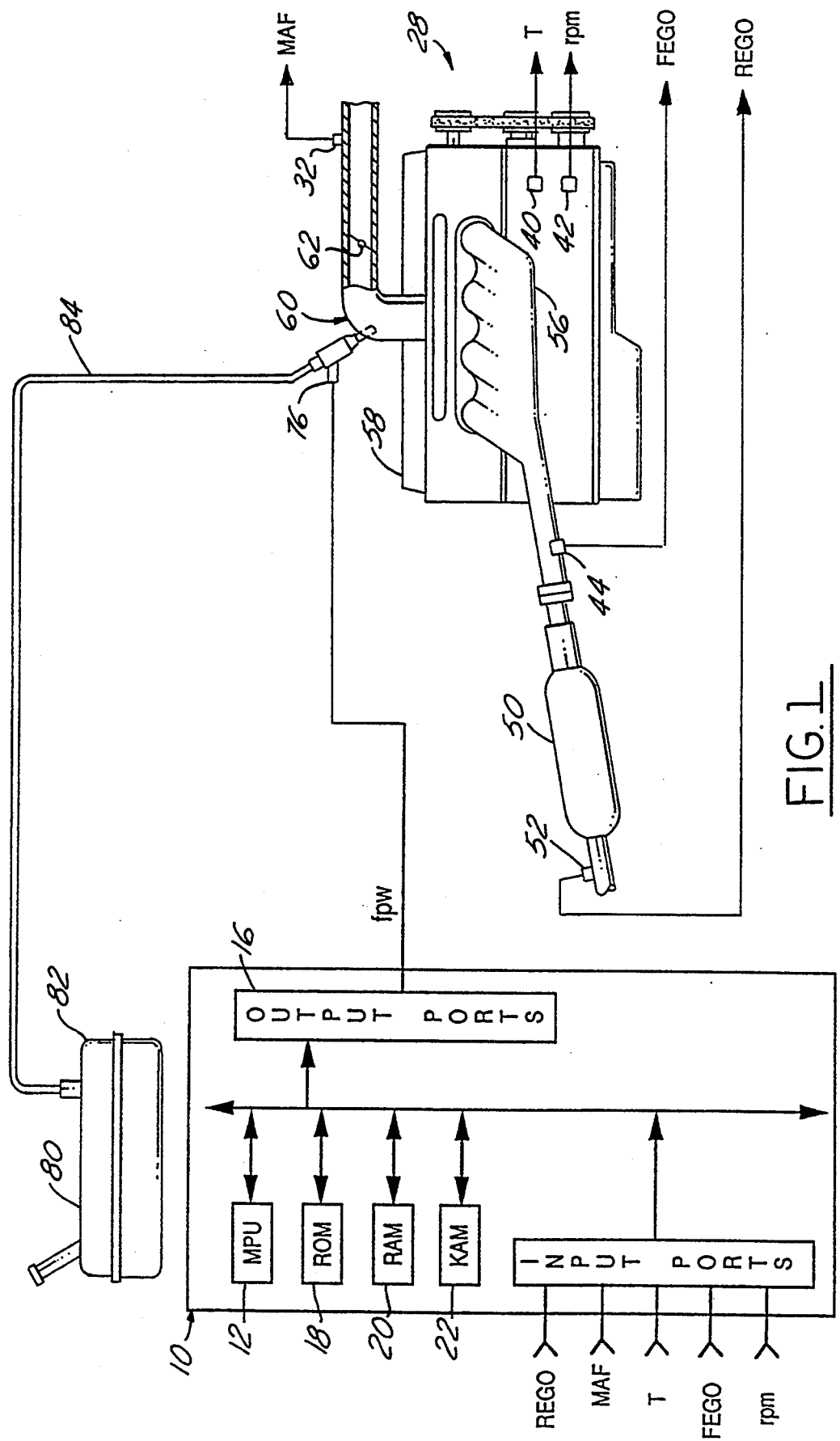
FIG. 1 is a block diagram of an embodiment wherein the invention is used to advantage.

Controller 10 is shown in the block diagram of FIG. 1 as a conventional microcomputer including: microprocessor unit 12; input ports 14; output ports 16; read-only memory 18; random access memory 20; keep-alive memory 22; and a conventional data bus. Controller 10 is shown receiving various signals from sensors coupled to engine 28 including: measurement of inducted mass airflow (MAF) from mass airflow sensor 32; engine coolant temperature (T) from temperature sensor 40; indication of engine speed (rpm) from tachometer 42; output signal FEGO derived by conventional filtering and threshold comparison of the output from conventional exhaust gas oxygen sensor 44 positioned upstream of catalytic converter 50; and signal REGO derived by conventional filtering and threshold comparison of the output from another conventional exhaust gas oxygen sensor (52) positioned downstream of catalytic converter 52.

Intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Other engine components and systems such as an ignition system are not shown because they are well known to those skilled in the art. Although a central fuel injection system is shown, the invention claimed herein may be used to advantage with other types of systems such as sequential fuel injection or carbureted systems. Those skilled in the art will also recognize that the invention claimed herein is applicable to other engine control configurations such as "stereo" control systems wherein the fuel injectors for each bank are controlled by a separate exhaust gas oxygen sensor positioned in each of the exhaust manifolds in engines having a "V" configuration.

Figure 2:
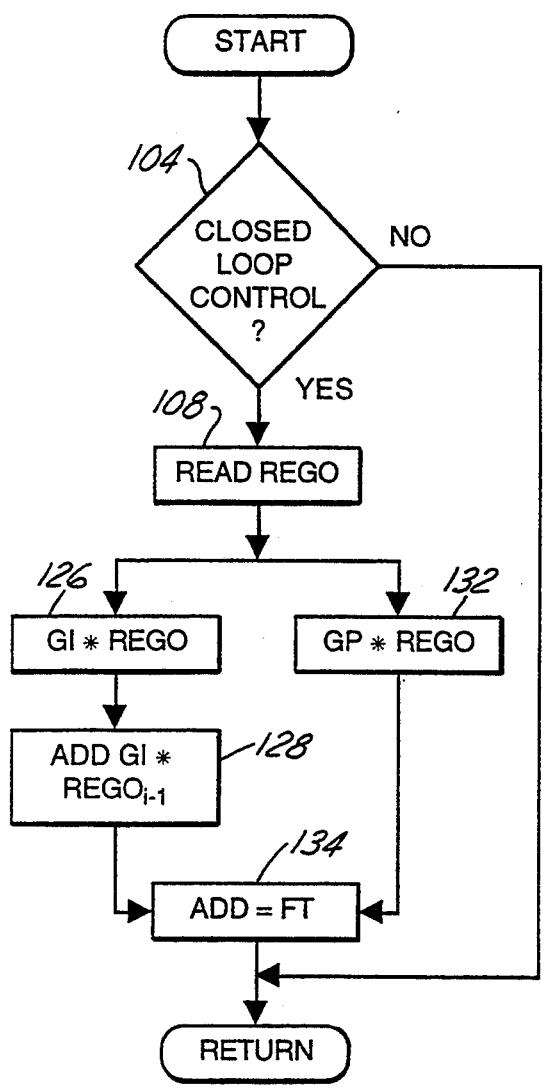
FIGS. 2–3, and 4A–4B are high level flowcharts of various operations performed by a portion of the embodiment shown in FIG. 1.

Referring now to FIG. 2, a flowchart of a routine performed by controller 10 to generate fuel trim signal FT is now described. In the particular example described herein, closed-loop air/fuel control is commenced (step 104) when engine temperature is within a predetermined range, the engine has been operating for at least a preselected time, and throttle position is within a preselected range. When closed-loop control commences, signal REGO is read (step 108), multiplied by gain constant GI (step 126), and the resulting product added to products previously accumulated (GI * RE- $GO_{i-1}$) in step 128. Stated another way, signal REGO is integrated each sample period (i) in steps determined by gain constant GI.

During step 132, signal REGO is multiplied by proportional gain GP. The integral value from step 128 is added to the proportional value from step 132 during addition step 134 to generate fuel trim signal FT.

Figure 3:
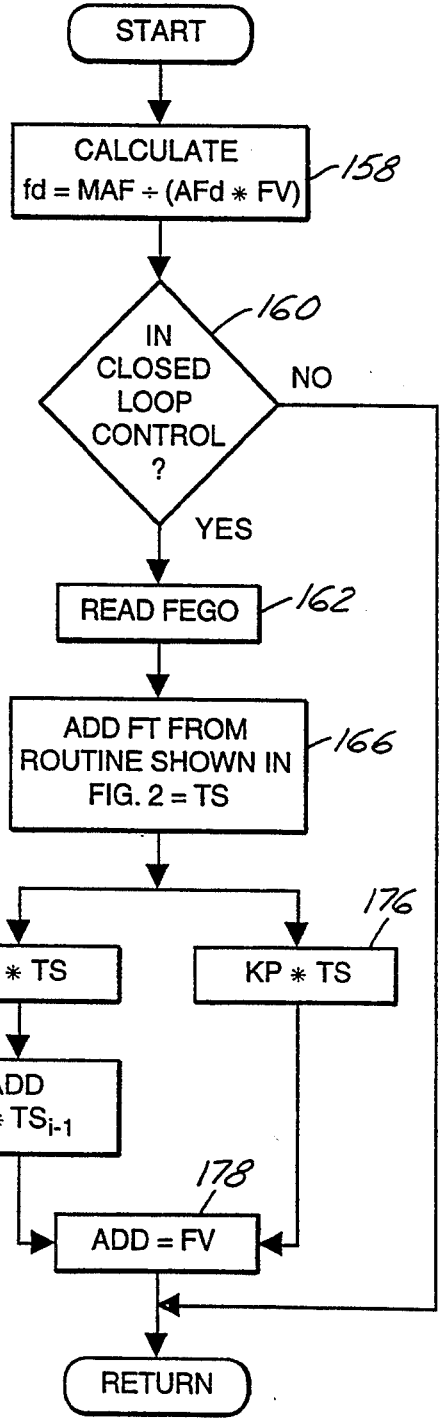

The routine executed by controller 10 to generate the desired quantity of liquid fuel delivered to engine 28 is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV which is generated as now described with respect to steps 160–178.

After determining that closed-loop control is desired (step 160), by monitoring engine operating conditions such as those previously described herein with reference to step 104 in FIG. 2, signal FEGO is read during step 162. Signal FEGO is then trimmed (in this example by addition) by trim signal FT which is transferred from the routine previously described with reference to FIG. 2 to generate trimmed signal TS. The product of integral gain value KI times trimmed signal TS (step 170) is generated and added to the previously accumulated products (step 172). That is, trimmed signal TS is integrated in steps determined by gain constant KI each sample period (i) during step 172. A product of proportional gain KP times trimmed signal TS (step 176) ms then added to the integration of KI * TS during step 178 to generate feedback variable FV.

Alternatively, the process described above with particular reference to FIG. 3 may be performed by biasing signal FV, rather than trimming signal FEGO, with fuel trim signal FT. In one such alternative embodiment, two proportional gain constants ($KP_1$ and $KP_2$) are used to advantage. Proportional gain $KP_1$ multiplies signal FEGO when it switches from a lean to a rich indicating state and proportional gain $KP_2$ multiplies signal FEGO when it switches from a rich to a lean state. Proportional term $KP_1$ is incremented when fuel trim signal FT indicates a lean bias is desired and proportional term $KP_1$ is decreased (or $KP_2$ incremented) when a rich bias is desired by fuel trim signal FT.

Figure 4A:
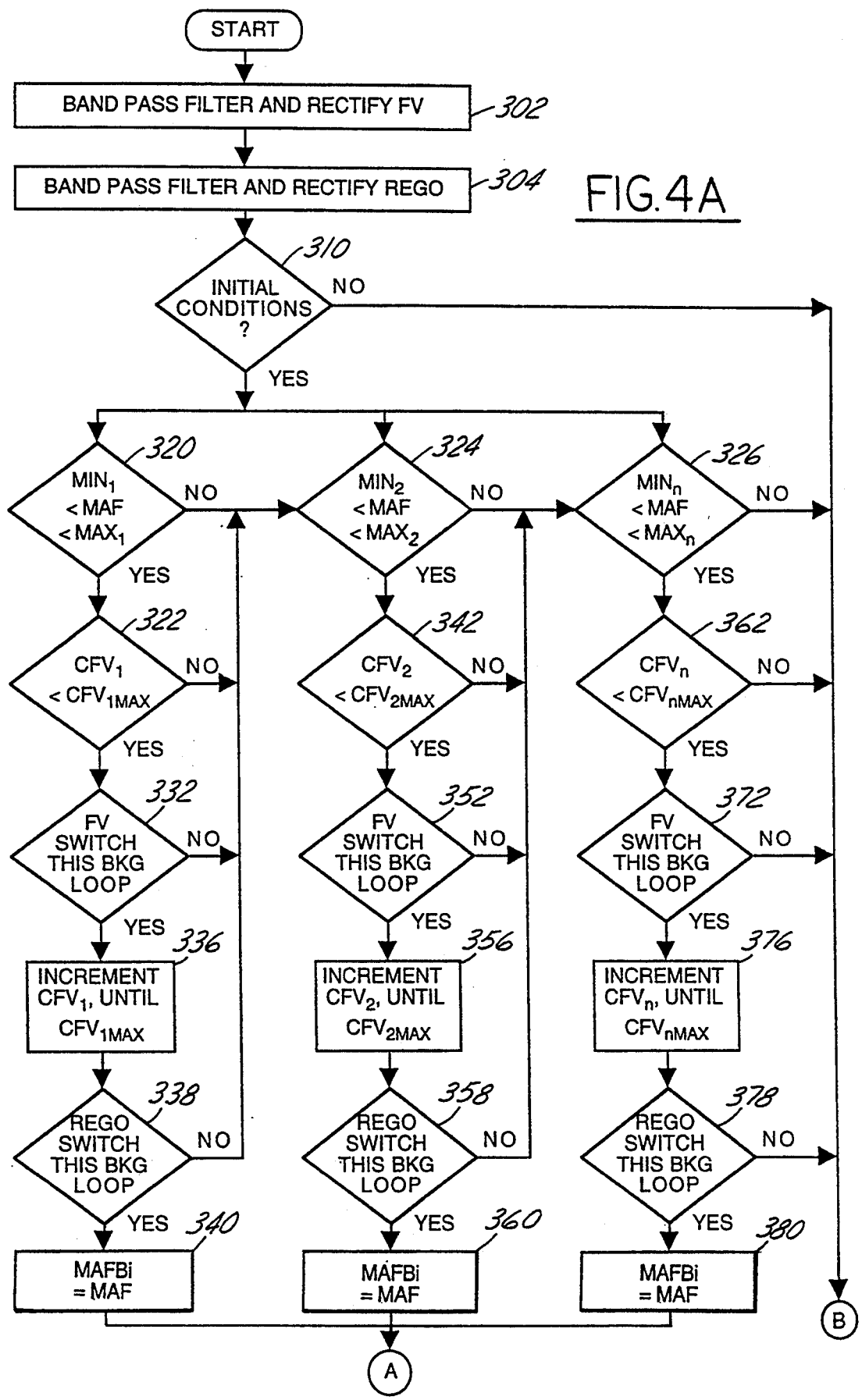
Figure 7:
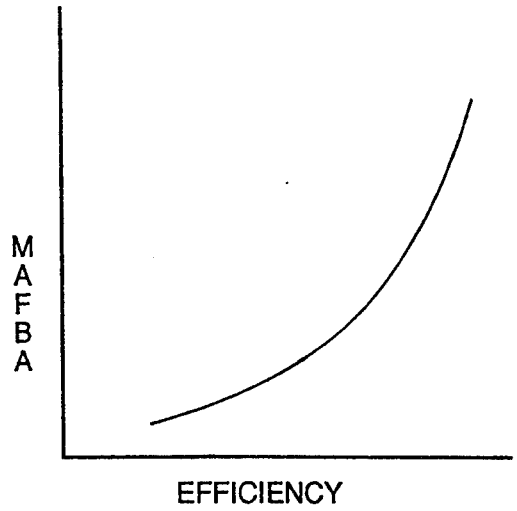
FIG. 7 is a graphical representation of converter efficiency.
Figure 4B:
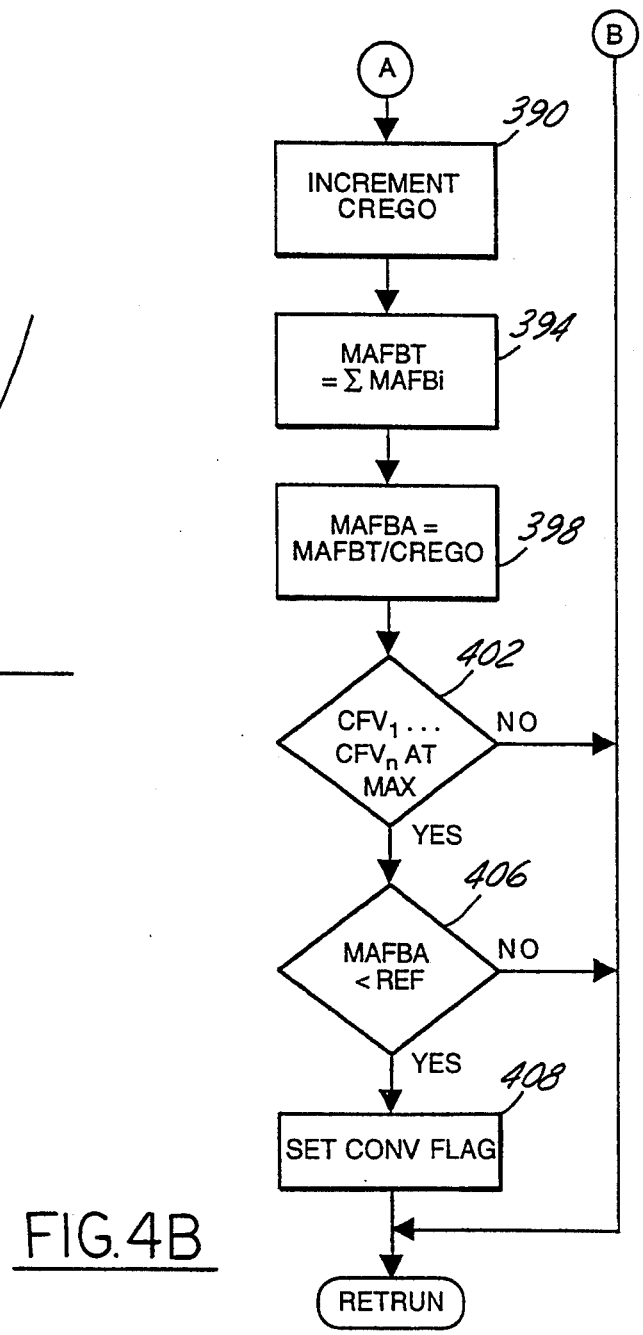
Figure 5A:
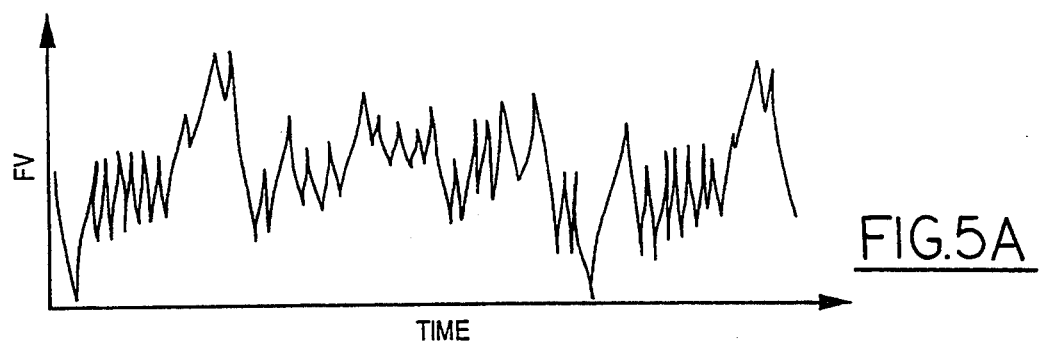
FIGS. 5A–5B and 6A–6B are graphical representations of various signals generated by a portion of the embodiment shown in FIG. 1.
Figure 5B:
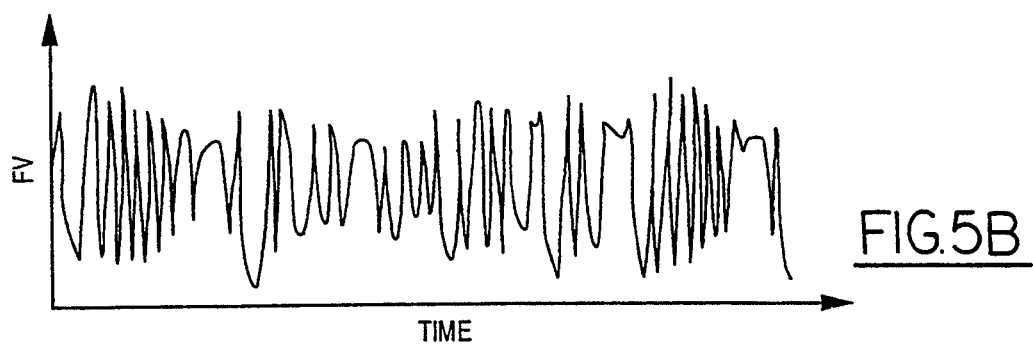
Figure 6A:
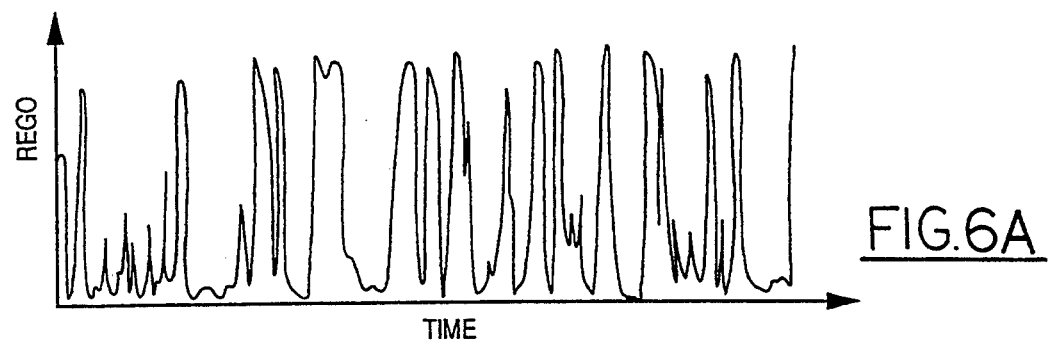
Figure 6B:
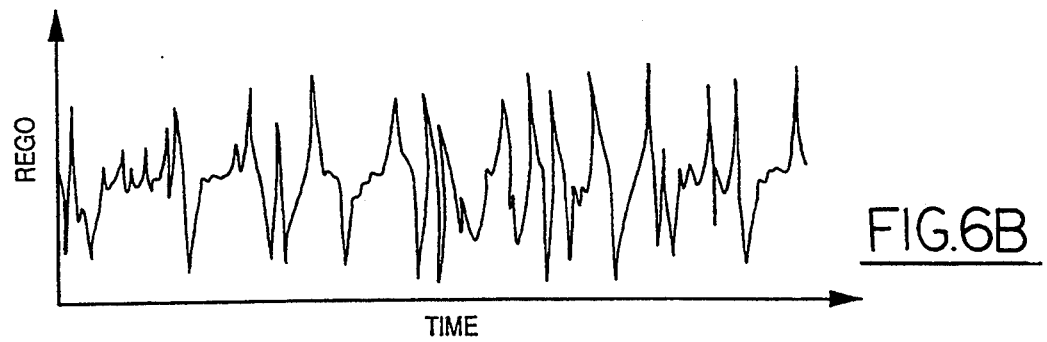

Referring now to FIGS. 4A–4B, signals FV and REGO are band pass filtered and then rectified during respective steps 302 and 304. A hypothetical signal FV is shown in FIG. 5A and in FIG. 5B after it is band pass filtered. Similarly, a hypothetical signal REGO is shown in FIG. 6A and after band pass filtering in FIG. 6B.

Returning to FIGS. 4A–4B, initial engine conditions are checked during step 310 before entering a test cycle or period which is now described. The inducted airflow range in which engine 28 is operating is determined during steps 320, 324, and 326. Engine 28 is operating within airflow range (1), when measurement of inducted airflow MAF is between minimum value $MIN_1$ and maximum value $MAX_1$ (step 320). However, if the count in transitions of feedback variable FV ($CFV_1$) is greater than a maximum value ($CFV_{1max}$), then catalytic converter 50 has been fully tested for inducted airflow range (1) and, accordingly, the test will proceed when engine 28 operates in the other airflow ranges (step 322).

Assuming the test of converter 50 is proceeding for inducted airflow range (1), count signal $CFV_1$ is incremented each transition between states of signal FV until it reaches its maximum count $CFV_{1max}$ (steps 332 and 336). The same procedure is followed when engine 28 is operating within airflow range (n) as shown in steps 326, 362, 372, and 376. The converter test cycle or period is completed when engine 28 has operated in each of "n" airflow ranges during a preselected number of transitions in signal FV for each of the "n" airflow ranges. A similar result may also be achieved by counting transitions in a signal derived from EGO sensor 34 in place of transitions in signal FV.

While engine 28 is operating in each of the airflow ranges and, transitions in downstream EGO sensor 52 (i.e., signal REGO) are monitored (step 338). A transition in signal REGO indicates exhaust emissions have exceeded the capacity of converter 50 at the particular inducted airflow range and measurement of inducted airflow MAF is stored as signal $MAFB_i$ (see step 340 assuming operation in airflow range (1)). Measurement of inducted airflow MAF is stored as signal $MAFB_i$ whenever signal REGO transitions during any of the "n" inducted ranges (e.g., steps 376–380 for airflow range "n").

Each transition of signal REGO, the total count in transitions of signal REGO which is designated as signal CREGO, is incremented in step 390. In addition, for each transition of signal REGO, the corresponding measurement of inducted airflow (signal $MAFB_i$) is added to the previously accumulated inducted airflow measurements which occurred at prior transitions of signal REGO. A total or accumulated airflow measurement corresponding to converter breakthrough (shown as signal MAFBT in step 394) is thereby generated.

During step 398, average signal MAFBA is generated by dividing signal CREGO into signal MAFBT. Stated another way, a representation of average inducted airflow at catalytic breakthrough is generated by averaging a total measurement of inducted airflow at breakthrough (MAFBT) by the corresponding counts of signal REGO (CREGO) at which each measured breakthrough occurred.

A determination of whether converter 50 has been tested over all inducted airflow ranges is made in step 402. More specifically, the test cycle is completed when the count in transitions of feedback variable FV for each of the inducted airflow ranges ($CFV_1 \ldots CFV_n$) has reached its respective maximum value ($CFV_{1max} \ldots CFV_{nmax}$). When the test cycle is completed, signal MAFBA is compared to reference value REF (step 406), and when it is below reference value REF the converter flag is set in step 408.

Those skilled in the art will recognize that actual measurements of inducted airflow (MAF and $MAFB_i$) need not be used, but any value correlated with the airflow ranges may be used such as scaling factors linearly related to such measurements. It is also recognized that the test period or cycle is completed when converter 50 has been tested over a plurality of airflow ranges referred to as sub-test. And each of these sub-test last for a duration indicated by a predetermined count in transitions of feedback variable FV. In this manner, the converter is tested when an indication that steady-state rather than transient operation is provided. Accordingly, consistent test results should be achieved regardless of the manner in which the vehicle is driven during the test period.

An example of operation is presented herein where both upstream sensor 44 and downstream sensor 52 are two-state exhaust gas oxygen sensors. The invention claimed herein, however, may be used to advantage with other sensors such as proportional sensors. Other modifications will become apparent to those skilled in the art without departing from the spirit and scope of the invention. Accordingly, it is intended that the scope of the invention be defined only by the following claims.

What is claimed:

1. A method for controlling engine air/fuel ratio and concurrently monitoring efficiency of a catalytic converter positioned in the engine exhaust, comprising the steps of:
    adjusting the engine air/fuel ratio in response to a feedback variable derived from an output of an upstream exhaust gas oxygen sensor positioned upstream of the converter;
    accumulating one of a plurality of airflow values upon each transition in output states of a downstream sensor positioned downstream of the converter, each of said airflow values being related to one of a plurality of inducted airflow ranges inducted into the engine and said airflow value which is accumulated upon said downstream sensor output transition is related to said airflow range in which said downstream sensor output transition occurred; and
    averaging said accumulated airflow values over a test period and providing an indication of converter degradation when said average falls below a preselected average.

2. The method recited in claim 1 further comprising the step of generating said test period when the engine has completed operation within each of a plurality of inducted airflow ranges for at least a minimum duration in each of said airflow ranges.

3. The method recited in claim 2 further comprising the step of generating each of said minimum durations by determining when a preselected number of transitions of a signal derived from said upstream sensor output has occurred while the engine is operating in one of said airflow ranges.

4. The method recited in claim 3 wherein said signal derived from said upstream sensor output comprises said feedback variable.

5. The method recited in claim 1 wherein said averaging step comprises the step of dividing said airflow values accumulated over said test period by an accumulation of said downstream sensor transitions over said test period.

6. The method recited in claim 4 further comprising the steps of band pass filtering said feedback variable and said downstream sensor output.

7. The method recited in claim 1 wherein said transitions in said upstream sensor output and said downstream sensor output are generated by comparing each sensor output to a reference.

8. The method recited in claim 1 further comprising the step of integrating said upstream sensor output to generate said feedback variable.

9. The method recited in claim 8 wherein said engine air/fuel adjusting step further comprises the step of trimming said integration by a trim signal derived from said downstream sensor output.

10. The method recited in claim 9 further comprising the step of integrating said downstream sensor output to generate said trim signal.

11. A method for controlling engine air/fuel ratio and concurrently monitoring efficiency of a catalytic converter positioned in the engine exhaust, comprising the steps of:
    adjusting the engine air/fuel ratio in response to a feedback variable generated by integrating an output of an upstream exhaust gas oxygen sensor positioned upstream of the converter and trimming said integration by a signal derived from an output of a downstream exhaust gas oxygen sensor positioned downstream of the converter;
    providing a converter test cycle by determining when the engine has completed operation within each of a plurality of inducted airflow ranges for at least a minimum duration in each of said airflow ranges;
    generating each of said minimum durations by determining when a preselected number of transitions in said feedback variable has occurred while the engine is operating in one of said airflow ranges;
    accumulating one of a plurality of airflow values upon each transition in output states of a downstream sensor positioned downstream of the converter, each of said airflow values being related to one of a plurality of inducted airflow ranges inducted into the engine and said airflow value which is accumulated upon said downstream sensor output transition is related to said airflow range in which said downstream sensor output transition occurred; and
    averaging said accumulated airflow ranges over said test period and providing an indication of converter degradation when said average falls below a preselected average.

12. The method recited in claim 11 wherein said averaging step comprises the step of dividing said airflow values accumulated over said test period by an accumulation of said downstream sensor transitions over said test period.

13. The method recited in claim 11 further comprising the steps of band pass filtering said feedback variable and said downstream sensor output.

14. A system controlling engine air/fuel ratio and concurrently monitoring efficiency of a catalytic converter positioned in the engine exhaust, comprising:
    an air/fuel controller for controlling the engine air/fuel ratio in response to a feedback variable generated by integrating an output of an upstream exhaust gas oxygen sensor positioned upstream of the converter and trimming said integration by a trim signal generated by integrating an output of a downstream exhaust gas oxygen sensor positioned downstream of the converter;
    test means for generating a converter test cycle when the engine has completed operation within each of a plurality of inducted airflow ranges for at least a minimum duration in each of said airflow ranges, each of said minimum durations provided when a preselected number of transitions in said feedback variable has occurred while the engine is operating in one of said airflow ranges;
    an accumulator for accumulating one of a plurality of airflow values upon each transition in output states of a downstream sensor positioned downstream of the converter, each of said airflow values being related to one of a plurality of inducted airflow ranges inducted into the engine and said airflow value which is accumulated upon said downstream sensor output transition is related to said airflow range in which said downstream sensor output transition occurred; and control means for averaging said accumulated airflow ranges over said test period and providing an indication of converter degradation when said average falls below a preselected average.

15. The system recited in claim 14 wherein said control means includes means for dividing said airflow values accumulated over said test period by an accumulation of said downstream sensor transitions over said test period.

16. The system recited in claim 14 further comprising filter means for band pass filtering said feedback variable and said downstream sensor output.

* * * * *